United States Patent
Taylor

[15] 3,680,361
[45] Aug. 1, 1972

[54] PRESSURE TESTING DEVICE

[72] Inventor: David John Taylor, Leamington Spa, England

[73] Assignee: Sykes-Pickavant Limited, St. Annes-on-Sea, Lancashire, England

[22] Filed: Oct. 14, 1970

[21] Appl. No.: 80,714

[30] Foreign Application Priority Data

Oct. 17, 1969 Great Britain....................51083

[52] U.S. Cl......................................13/49.2, 73/45.8
[51] Int. Cl..............................................G01m 3/32
[58] Field of Search............73/49.2, 49.1, 45.8, 49.7

[56] References Cited

UNITED STATES PATENTS 2,981,095   4/1961   Eshbaugh...................73/45.8 X
3,138,949   6/1964   Pipes.............................73/45.8 X Primary Examiner—Louis R. Prince
Assistant Examiner—William A. Henry, II
Attorney—Kenway, Jenney & Hildreth

[57] ABSTRACT

A pressure testing device for testing whether an internal combustion engine cooling system is fluid-tight under normal operating pressure and whether a pressure regulator valve in the filler cap of the cooling system is functioning correctly comprising a pressure chamber, an air pump connected to the pressure chamber to supply air under pressure thereto, a pressure gauge connected to the pressure chamber to indicate the pressure in the chamber and an outlet connection from the pressure chamber for connection to a cooling system filler neck or to a filler cap, the outlet connection having adjustable attachment means suitable for engagement with conventional inter-engagement surfaces of filler necks and of filler caps of a variety of sizes, the device also being provided with at least one adaptor to adapt the outlet connection for sealing engagement with various sizes of filler necks and/or filler caps.

13 Claims, 5 Drawing Figures

PRESSURE TESTING DEVICE

BACKGROUND TO THE INVENTION

This invention relates to a pressure testing device and more specifically to devices for testing internal combustion engine pressurized cooling systems and filler caps.

Typical devices hitherto employed for testing internal combustion engine pressurized cooling systems and filler caps are operated by attachment thereof to a filler neck in place of the filler cap or to the filler cap respectively. These known devices incorporate an air pump for supplying compressed air to a pressure chamber, a pressure gauge for indicating the pressure in the chamber and a connector for connecting the pressure chamber to the device to be tested. In use the chamber is connected to the device to be tested and the pump is operated. In the case of a filler cap the gauge indicates the pressure at which the relief valve opens. With both a cooling system and a cap a substantial fall in pressure after pumping has stopped indicates a leak. These known devices suffer from the disadvantage that by reason of several different sizes of the inter-engaging surfaces of filler necks and filler caps in common usage several complicated adaptors incorporating various attachment means are required, rendering the device bulky and also time-consuming in operation.

OBJECTS OF THE INVENTION

It is a primary object of the invention to provide an improved pressure testing device for internal combustion engine pressurized cooling systems and filler caps.

A further object of the invention is to provide a pressure testing device for the above purpose which can be used with different sizes of filler necks and filler caps without the requirement of a plurality of adaptors incorporating engagement means corresponding to the standard inter-engagement surfaces of the various caps and necks.

SUMMARY OF THE INVENTION

According to the present invention there is provided a pressure testing device for internal combustion engine cooling systems and filler caps comprising a pressure chamber, an air pump connected to the pressure chamber to supply air under pressure thereto, a pressure gauge connected to the pressure chamber to indicate the pressure in the chamber and an outlet connection from the pressure chamber for connection to a cooling system filler neck or a filler cap, the outlet connection having adjustable attachment means suitable for engagement with conventional inter-engagement surfaces of filler necks and of filler caps of a variety of sizes.

An adaptor may be required to adapt the outlet connection to the sealing surfaces of some cooling systems filler necks and filler caps but these can be very simple in that they do not require attachment means for attaching the neck or cap to the outlet connection.

BRIEF DESCRIPTION OF THE DRAWINGS

One embodiment of the invention will now be described in more detail with reference to the accompanying drawings in which.

DESCRIPTION OF A PREFERRED EMBODIMENT

Figure 1:
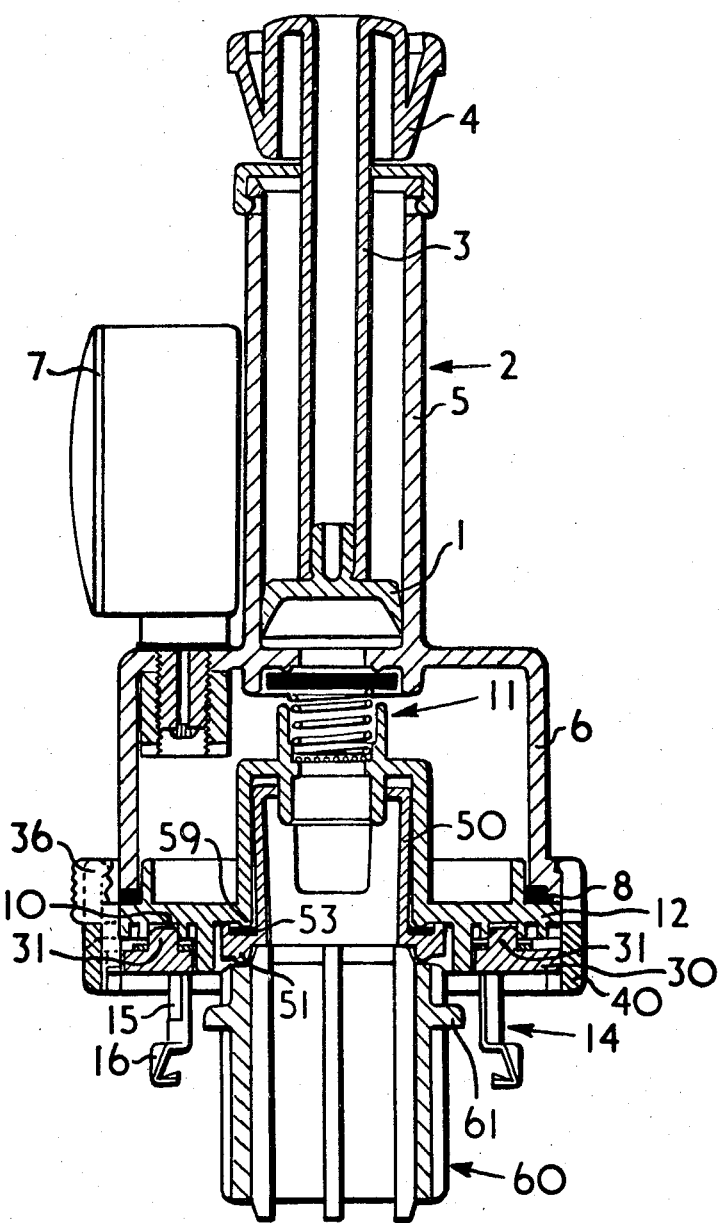
FIG. 1 is a diagrammatic vertical section of a pressure testing device.

The pressure testing device shown in the drawing is constructed primarily from a series of mouldings of tough plastics material. In addition there are a series of rubber seals and one or two metallic components. Apart from the seals and those components specifically stated to be manufactured of metal, the remaining components are plastics mouldings.

The pressure testing device comprises a pressure chamber 6 to which is connected a pump 2 and a pressure gauge 7. At the lower end of the device remote from the pump 2 there is an outlet connection to be coupled to either a filler cap or a filler neck.

The pump 2 comprises a barrel 5 in which a piston 1 is slidable. The piston is operated by means of a piston rod 3 and a handle 4 moulded integrally with the piston rod.

The pump barrel 5 is disposed at the top of the pressure chamber 6 and is part of the same moulding as the pressure chamber 6. A non-return valve 11 constituted by a rubber sealing member held in position by a coiled wire spring is disposed between the barrel 5 and chamber 6 such that pressure may be established and maintained in the pressure chamber 6. The pressure gauge 7 registers the pressure inside the pressure chamber 6.

The base of the pressure chamber 6 comprises a plate 12 provided with a series of downwardly extending ribs which form two operative grooves 10 and two operative grooves 13 on the face of the plate remote from the pressure chamber. The function and purpose of the grooves 10 and 13 will be described more fully hereinafter. An O-ring 8 is interposed between the pressure chamber 6 and the plate 12 to ensure fluid-tight engagement therebetween.

A pair of spring steel clips 14 form an attachment means for attaching the pressure testing device to a filler cap or a filler neck. Each clip comprises a base portion 19 of arcuate form and a downwardly directed portion 15, the base portion 19 of each clip 14 being provided at one end thereof with an upwardly directed guide portion 17 which co-operates with one of the grooves 13 on the plate 12. At the other end of the base portion 19 of each clip 14 is provided a hole 18, the purpose of which will be explained more fully hereinafter. The clips 14 are spring steel pressings, surface treated to make them corrosion resistant.

Figure 2:
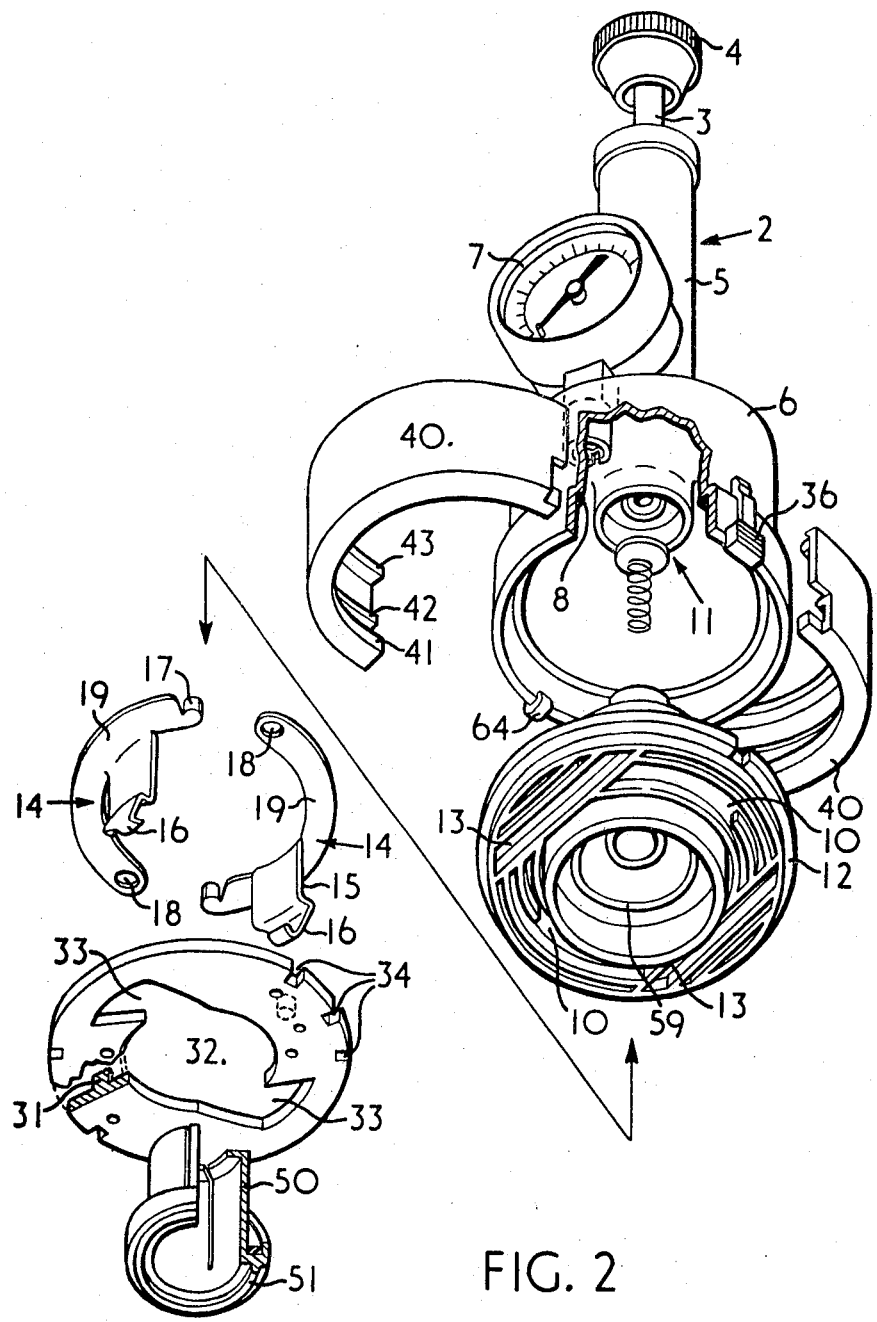
FIG. 2 is a diagrammatic exploded perspective view of the pressure testing device of FIG. 1.
Figure 3:
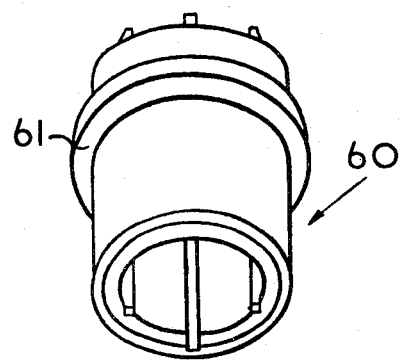
FIG. 3 is a diagrammatic perspective view of an adaptor required in some uses of the pressure testing device.

The clips 14 are disposed such that the base portions 19 thereof are interposed between the plate 12 and a plate 30, the downwardly directed portions 15 of the clips passing through apertures 33 in the plate 30. Plate 30 is provided, on that side thereof facing the plate 12, with a pair of integrally moulded pegs 31, each peg engaging a hole 18 on the base portion 15 of one of the clips 14 and extending into a groove 10 in the plate 12. Plate 30 and plate 12 are attached to the pressure chamber 6 by means of a pair of resilient half collars 40. Each half collar 40 is provided on the radially inner surface thereof with three circumferentially extending flanges 41, 42 and 43, best seen in FIG. 2, flanges 41 and 43 being disposed along each edge of each half collar, and flange 42 being spaced apart from both edges of each half collar. Flange 43 engages with a shoulder on the pressure chamber 6 and flange 42 engages with the surface of plate 12 such that upon assembly of the half collars 40 about the pressure chamber and plate 12, plate 12 is tightly attached to the pressure chamber and the junction is sealed by the O-ring 8. Flange 41 however, engages below the under surface of plate 30 with a clearance so that it attaches the plate 30 to plate 12 and the pump body 6 with a sliding fit to enable relative rotation of plate 30 with respect to plate 12.

Figure 4:
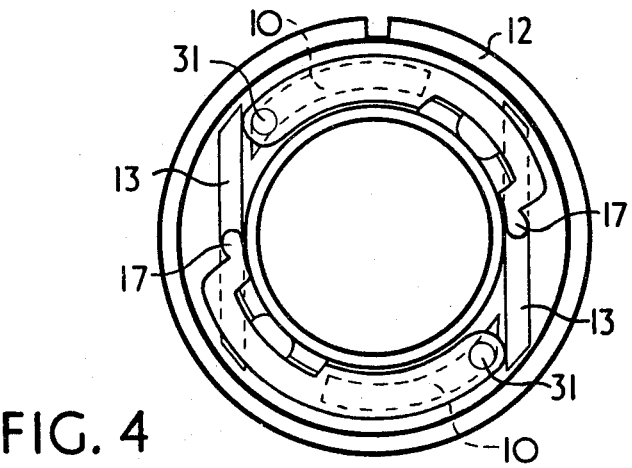
FIGS. 4 and 5 are diagrammatic underplan views of part of the adjustment mechanism to illustrate the operation of this adjustment mechanism.
Figure 5:
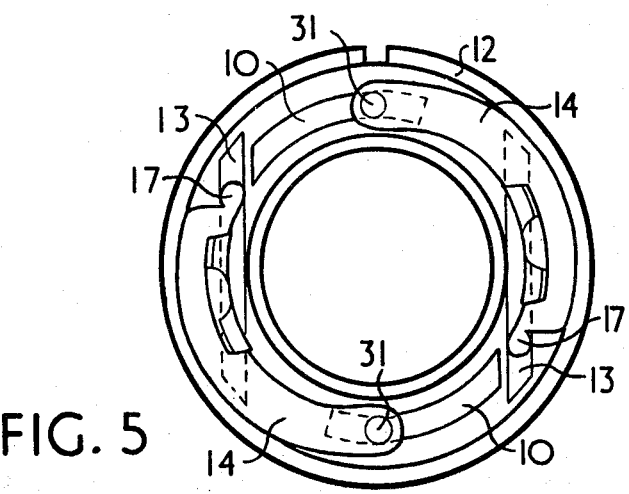

Relative rotation between the plate 30 and the plate 12 causes adjustment of the position of the clips 14 so that they move radially in and out as well as rotating angularly. The nature of the adjusting movement can best be understood with reference to FIGS. 4 and 5. In these two figures the plate 12 is represented in an over-simplified form, merely showing the outline of the plate 12 and of the grooves 10 and 13. The clips 14 are shown in full, but the plate 30 has been omitted and is represented merely by the pegs 31 which form part of this plate. FIGS. 4 and 5 show clearly that the grooves 10 which receive the pegs 31 are arcuate grooves centered about the center of the plate 12. This is also the center of relative rotation between the plate 12 and the plate 30. In contrast, the grooves 13 are straight tangential grooves so that their distance from the center of rotation varies along the length of the groove. The grooves 10 receive the guide portions 17 of the clips 14. The grooves 10 and 13 form a guide means on the plate which co-operates with further guide means movable with the attachment means (i.e., clips 14). The further guide means are constituted by the guide portions 17 and pegs 31. The plate 30 forms a carrier for attachment means or clips 14.

FIG. 4 shows the situation in which the plate 30 (and the pegs 31) are rotated fully anti-clockwise with respect to the plate 12 viewing these components from below. In this position the guide portion 17 of each clip 14 is in the center of its respective groove 13 which is the radially innermost portion of this slot. Thus the downward projections 15 of the clips are also in their radially innermost positions. Rotation of the plate 30 in a clockwise direction and corresponding movement of the pegs 31 around the arcuate grooves 10 in a clockwise direction results in movement towards the position shown in FIG. 5. As the pegs 31 move around the groove, the clips 14 move with these pegs and cause the guide portions 17 of the clips to slide along the grooves 13. As these grooves are tangential the distance of the guide portions 17 from the center of rotation of the plates increases and thus the distance of the portions 15 of the clips from the center of rotation and from each other increases. Due to the diametrically opposed symmetrical relationship between the pairs of slots 10 and 13, the clips 14 and the pegs 31, the arrangement is such that the downwardly extending portions 15 of the clips remain diametrically opposed and mutually parallel during the adjustment movement. This adjustment has been described without detailed reference to the plate 30. The shape of the two apertures 33 is such that the appropriate movements of the downwardly projecting portions 15 of the clips 14 can take place.

In order to obtain standard increments of displacement between the downwardly directed portions 15 of the clips 14, plate 30 is provided on the edges thereof with slots 34 which can be engaged by a key 36 disposed in a recess 35 on the pump body 6 so as to enable plate 30 to be locked in a number of positions corresponding to the number of slots 34 therein, three such positions being shown in FIG. 1.

The downwardly directed portion 15 of each clip 14 is hook-shaped at the end portion 16 thereof to enable either a filler cap to be secured on the outside thereof by a conventional screwing motion or a filler neck to be screwed on the inside thereof respectively. The material of the clips 14 is sufficiently thin to permit one standard size of filler cap to be fitted outside the end portions 16 or the corresponding standard filler neck to be fitted on the inside of the end portions 16, without disturbing the adjustment of the clips 14.

Plates 12 and 30 are each provided with centrally disposed apertures 20 and 32 respectively to enable a filler cap or a filler neck to communicate with the interior of the pressure chamber 6. Two adaptors are provided, 50 shown in FIG. 1 and 60 shown in FIG. 2. Adaptor 50 is provided to enable the pressure testing device to be attached to certain sizes of filler cap in fluid-tight engagement therewith, and adaptor 60 is provided to enable the pressure testing device to be attached to various sizes of filler neck in fluid-tight engagement therewith. These adaptors will be described in greater detail in relation to their use.

The method of operation of the pressure testing device will now be described.

In order to test an automotive or other internal combustion engine cooling system the filler cap is removed from the filler neck of the cooling system to enable the pressure testing device to be attached to the filler neck. The displacement between the clips 14 is adjusted in order to enable the device to be screwed onto the radiator neck; for this one of several standard positions is chosen by rotation of clips 14 and plate 30 and then locking the plate 30 in the desired position by means of the key 36. With the adaptor 50 removed, the adaptor 60 is then positioned so that its upper surface bears upon a shoulder 59 on the plate 12 adjacent the aperture 20. The adaptor 60 has an outwardly directed flange 61 in such a position that it will bear on the conventional sealing surface in the filler neck. The pressure device is then screwed onto the radiator neck with the hook portions 16 of the clips 14 being disposed externally of the radiator neck.

In order to determine whether the cooling system is leaking the handle 4 of the pump 2 is reciprocated to pressurize the cooling system and the pressure chamber to the normal running pressure of the cooling system. If a leak exists in the cooling system, the pressure recorded on pressure gauge 7 will fall at a rate depending on the extent of the leak.

If a leak is indicated on the pressure gauge 7 then the visible parts of the cooling system can be scanned visually to check for external leaks. If the test is carried out with the cooling fluid at ambient temperature any escaping fluid should be clearly visible as it will not vaporize as quickly as cooling fluid at its normal running temperature. If no external leak is observed, then an internal leak is indicated. Such an internal leak may be a leak of water between a water passage and a working cylinder due to a faulty cylinder head gasket. If this is the case, then on running the internal combustion engine with the pressure testing device still in position, the pressure gauge will fluctuate at a frequency corresponding to that of the reciprocation of the piston in the leaking cylinder. If on the other hand the internal leak is between a water passage and an inlet or exhaust passage, no pressure fluctuation occurs.

If the filler neck to which the pressure testing device is to be connected is of a different standard size from the basic size of the outlet connection so that the axial distance between the end portions 16 of the clips 14 and the flange 61 of the adaptor 60 do not correspond with the dimensions of the filler neck, then a spacer should be inserted between the adaptor 60 and the plate 12. The dimensions of the adaptor 59, which is primarily for use in the testing of certain sizes of the filler caps forms a suitable spacer as shown in FIG. 1.

The device may also be used to test the upper pressure limit of the pressure relief valve in a conventional filler cap. To this end the adaptor 50 may be employed, dependent upon the reach of the radiator cap. Some caps are of such a size that they will seal directly against the shoulder 59 when engaged in the end portions 16 of the clips 14. In such a case adaptor 50 is not required. In other cases the adaptor 50 is inserted into the pressure testing device as shown in FIG. 1 and the filler cap can then be sealed against the shoulder 51 of adaptor 50. A fluid-tight fit between the adaptor 50 and the plate 12 is ensured by a seal 53. As already described, the displacement between the portions 15 of the clips 14 is adjusted to the desired degree and plate 30 is locked in position by means of the key 36. It is normally possible to arrange for a single setting of the upstanding portions 15 of the clips 14 to be used for testing a cooling system and the filler cap of that system. The filler cap will engage around the outer surfaces of the hook portions 16 whereas it is the internal portions of the hook portions 16 which engage the filler neck of the cooling system.

When a filler cap has been mounted on the pressure testing device, with or without the adaptor 50 as required, the pressure chamber 6 is pressurized by means of the pump 2. The pressure is built up until the relief valve operates and thereby prevents any further pressure building up. The maximum pressure achieved should correspond approximately to the design pressure of the cooling system. If this pressure cannot be maintained for a substantial time without further pumping, this indicates a leak in the filler cap. In order to ensure that a minute leakage does not cause a substantial rate of fall of pressure, the pressure testing device is provided with an air reservoir formed by the volume within the pressure chamber 6.

As most of the pressure testing device is manufactured from a tough plastics material and the clips 14 are manufactured from spring steel which has been rendered corrosion resistant, the whole of the pressure testing device is corrosion resistant. This is particularly important when testing installations filled with corrosive anti-freeze mixtures.

The construction of the pressure testing device is such that it is constituted from only a small number of plastics mouldings and is simple to assemble and dismantle when required for servicing. The two half collars 40 act as spring clips which can be snapped on to join together the plate 12 and pressure chamber 6. To this end the flanges 42 and 43 have slight undercuts to enable them to grip correspondingly shaped surfaces on the plate 12 and pressure chamber 6. During the assembly operation a lug 64 on the body 6 ensures that the half collars 40 are positioned in their correct circumferential positions and in these positions the ends of half collars 40 remote from the lug 64 serve to locate the key 36.

It will be appreciated that the pressure testing device is of a relatively simple construction requiring only one simple adaptor for a range of filler caps and one adaptor for a range of filler necks, the clips being adjustable to all of the standard sizes of filler caps and filler necks.

I claim:

1. A pressure testing device for internal combustion engine cooling systems and filler caps comprising:
   a. a pressure chamber;
   b. an air pump connected to the pressure chamber to supply air under pressure thereto;
   c. a pressure gauge operatively connected to the pressure chamber to indicate the pressure in the chamber;
   d. an outlet connection from the pressure chamber for connection to a cooling system filler neck or a filler cap and;
   e. adjustable attachment means associated with the outlet connection, suitable for engagement with conventional inter engagement surfaces of filler necks and of filler caps of a variety of sizes;
   f. the attachment means comprising two sheet metal clips, the inner surfaces of which are adapted to engage a filler neck and the corresponding outer surfaces of which are adapted to engage a filler cap corresponding to the said filler neck, without adjustment of the position of the clips from the position in which they engage the filler neck.

2. A pressure testing device as claimed in claim 1 further comprising an adjustment mechanism such that the two clips are maintained in diametrically opposed positions throughout their range of adjustment.

3. A pressure testing device according to claim 1 further comprising an adjustment mechanism which comprises a fixed plate having guide means thereon, co-operating guide means movable with the clips for engaging with the guide means on the plate, and clips carrier adapted to maintain the clips in diametrically opposed positions as they are guided with respect to the fixed plate, the guide means being such that on rotation of the clips with their carrier an adjustment of the spacing of the clips takes place.

4. A pressure testing device as claimed in claim 3 including a locking means for securing the carrier in a desired location.

5. A pressure testing device according to claim 3 in which the guide means on the plate comprises two circumferential grooves, one for one end portion of each clip and two tangential grooves one for the other end portion of each clip.

6. A pressure testing device according to claim 1 comprising a first sealing shoulder forming part of said outlet connection for engagement with caps of one size, an adaptor having a surface for sealing engagement with said sealing shoulder and having a further sealing shoulder different in diameter from the diameter of said first sealing shoulder for engagement with caps of a size other than said one size.

7. A pressure testing device for internal combustion engine cooling systems and filler caps comprising:
   a. a pressure chamber;
   b. an air pump connected to the pressure chamber to supply air under pressure thereto;
   c. a pressure gauge operatively connected to the pressure chamber to indicate the pressure in the chamber;
   d. an outlet connection from the pressure chamber for connection to a cooling system filler neck or a filler cap; and
   e. radially adjustable attachment means associated with the outlet connection, suitable for engagement with conventional inter-engagement surfaces of filler caps of a variety of diameters.

8. A pressure testing device according to claim 7, said attachment means comprising two clips, said device further comprising an adjustable mechanism such that the two clips are maintained in diametrically opposed positions throughout their range of adjustment.

9. A pressure testing device according to claim 7 further comprising an adjustment mechanism which comprises a fixed plate having guide means thereon, cooperating guide means movable with the attachment means for engaging with the guide means on the plate, and an attachment means carrier adapted to maintain the attachment means in diametrically opposed positions as they are guided with respect to the fixed plate, the guide means being such that on rotation of the attachment means with their carrier an adjustment of the spacing of the attachment means takes place.

10. A pressure testing device as claimed in claim 9 including a locking means for securing the carrier in a desired location.

11. A pressure testing device according to claim 9 in which the guide means on the plate comprise two circumferential grooves, one for one end portion of each clip and two tangential grooves one for the other end portion of each clip.

12. A pressure testing device according to claim 7 comprising a first sealing shoulder forming part of said outlet connection for engagement with caps of one size, and adaptor having a surface for sealing engagement with said sealing shoulder and having a further sealing shoulder different in diameter from the diameter of said first sealing shoulder for engagement with caps of a size other than said one size.

13. A pressure testing device for internal combustion engine cooling systems and filler caps comprising:
   a. a pressure chamber;
   b. an air pump connected to the pressure chamber to supply air under pressure thereto;
   c. a pressure gauge operatively connected to the pressure chamber to indicate the pressure in the chamber;
   d. an outlet connection from the pressure chamber for connection to a cooling system filler neck or a filler cap;
   e. attachment means associated with the outlet connection, suitable for engagement with conventional filler neck engaging surfaces of a filler cap;
   f. means for adjusting the position of the attachment means in radially inward and outward directions whereby said attachment means can be engaged with caps of varying sizes.

* * * * *